United States Patent [19]
Kunioka et al.

[11] 4,158,758
[45] Jun. 19, 1979

[54] METHOD AND APPARATUS FOR HEAT TREATMENT OF METAL MEMBER

[75] Inventors: Kazuo Kunioka; Takao Noguchi; Tomoshige Sudo, all of Yokohama, Japan

[73] Assignee: Nippon Kokan Kabushiki Kaisha, Tokyo, Japan

[21] Appl. No.: 820,855

[22] Filed: Aug. 1, 1977

[30] Foreign Application Priority Data

Aug. 3, 1976 [JP] Japan .................................. 51/92052

[51] Int. Cl.² .............................................. H05B 5/06
[52] U.S. Cl. .................................. 219/10.43; 148/148; 219/10.71; 266/113
[58] Field of Search .................... 219/10.41, 10.43, 7.5, 219/8.5, 10.57, 10.69, 10.71, 10.73, 10.79, 10.75, 10.77; 148/144, 148, 150, 154; 266/113, 114

[56] References Cited

U.S. PATENT DOCUMENTS

| | | | |
|---|---|---|---|
| 2,666,830 | 1/1954 | Dreyfus | 219/10.69 |
| 3,127,496 | 3/1964 | Finzi et al. | 219/10.71 |
| 3,182,168 | 5/1965 | Cornell | 219/10.43 |
| 3,610,861 | 10/1971 | Storey | 219/10.77 |
| 3,915,763 | 10/1975 | Jennings et al. | 148/150 |
| 4,075,450 | 2/1978 | Lavins | 219/10.71 |

Primary Examiner—Bruce A. Reynolds
Attorney, Agent, or Firm—Haseltine, Lake & Waters

[57] ABSTRACT

In continuous induction heat treatment of an elongated metal member, additional local induction heating is applied to an end portion or portions of the metal member, thereby to obtain uniform induction heating temperature distribution over the whole length of the metal member. The additional local heating or preheating the end portion of the metal member is performed by the use of a preliminary induction heating coil which is maintained in predetermined relative relationship with the metal member for a predetermined period of time.

3 Claims, 22 Drawing Figures

METHOD AND APPARATUS FOR HEAT TREATMENT OF METAL MEMBER

BACKGROUND OF THE INVENTION

This invention relates to a method and an apparatus for induction heating an elongated metal member, such as a steel pipe, which is passed through an annular induction heating coil, to obtain a uniform distribution of induction heating temperature over the whole length of the member by means of additional local induction heating against an end portion or portions of the member, whereby uneven heating temperature distribution, which could otherwise take place in the end portion, can be avoided.

Figures 1, 2:
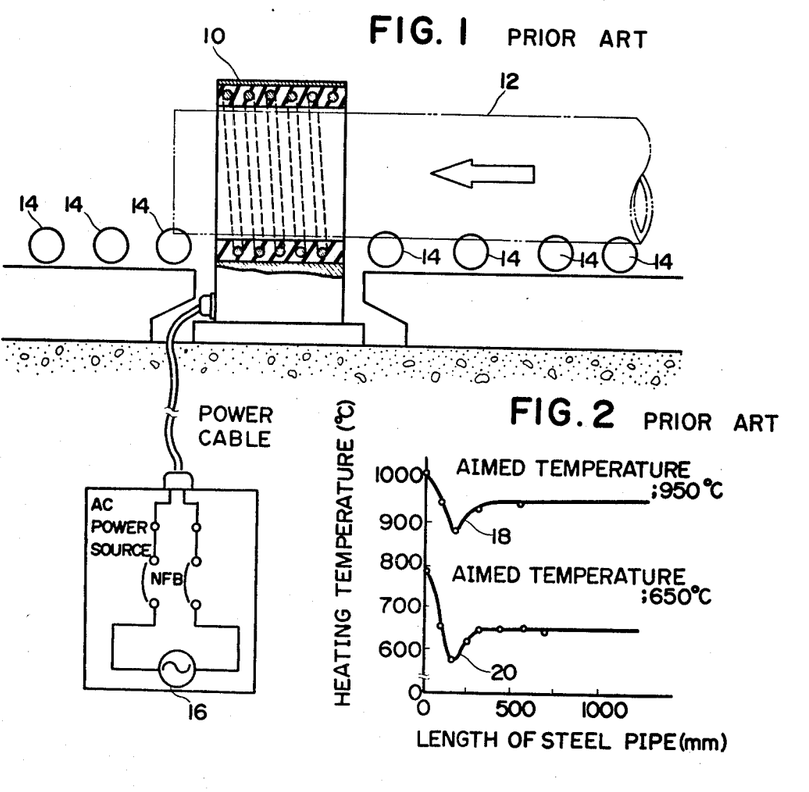
FIG. 1 is a schematic side view illustrating a prior art apparatus for induction heating a metal member.
FIG. 2 is a graph representing examples of induction heating temperature distributions in the prior art which have V-shaped portions appearing in an end portion of a steel pipe.
Figure 3:
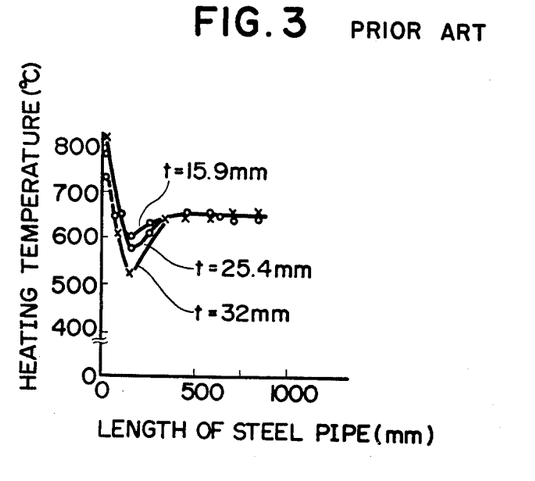
FIG. 3 is a graph for explaining changes in V-shape heating temperature distribution appearing in an end portion of a steel pipe, wall thickness of the pipe being taken as the parameter.
Figure 4:
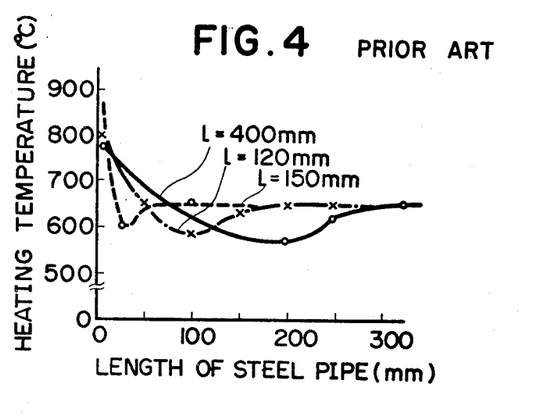
FIG. 4 is a graph for explaining changes in V-shape heating temperature distribution appearing in an end portion of a steel pipe, length of an induction heating coil being taken as the parameter.

Conventionally, continuous induction heating of an elongated metal member, such as a steel pipe, which is being conveyed longitudinally at a predetermined speed, has been performed by passing the metal member 12 through an annular induction heating coil 10, as shown in FIG. 1. The metal member 12 is conveyed at a fixed speed to pass through the coil 12, by means of conveyer rolls 14 which are driven by a motor. The induction heating coil 10 is supplied with AC power of a predetermined frequency from an Ac power source 16 so that a desired or aimed high temperature may be created in the metal member 12. The created temperature can be of the desired or aimed value in the central major portion of the metal member 12 except end portions of some length of the member. In the end portions, however, the temperature differs from that in the major portion because of influences of induction heating property, magnetic field intensity created by the coil 10, inclination in the magnetic filed intensity, frequency of the AC power source, and the shape in the end portions, and thus, in the prior art, uniform heating over the whole length of the metal member 12 including the end portions thereof could not be obtained even with any control in the supply of current. FIG. 2 shows examples of induction heating temperature distribution in the prior art which were taken with respect to a steel pipe having a 610 millimeter outer diameter and a 25.4 millimeter wall thickness. In FIG. 2, curves 18 and 20 show respectively temperature distributions along the length of the pipe which appeared when aimed temperatures were 950° C. and 650° C. As seen from FIG. 2, the value of temperature is the highest at the initial point of the curve which corresponds to the end point of the pipe, then decreases down to a degree below the aimed value, and then increases up to the level of the aimed value, thus making a generally V-shaped curve portion, which is referred to as a so-called V-shape heating phenomenon. The depth of this V shape, i.e., depression from the initial point to the bottom point of V, will be larger as the wall thickness t of a metal member increases, as shown in FIG. 3, and, the width of this V shape, i.e., the distance from the initial point to a point where the other end of the V-shaped curve portion comes to the aimed level, will be larger as the length l of the induction coil increases, as shown in FIG. 4. Such uneven temperature distribution will necessarily have disadvantageous influences on the quality, shape, etc. of the heat treated metal member. In order to avoid such influences on a metal member to be heat treated, in the prior art, metal dummy members of a length have been attached, prior to heat treatment, to both ends of the main metal member to be heat treated so that the V-shape heating temperature region may occur within and be limited to the length of the dummy members without affecting the main metal member. Alternatively, after heat treatment, end portions of a length where V-shape heating took place have been cut away from the main body of metal member. Employment of dummy members, however, requires an enlarged and complicated induction heat treatment system as well as additional steps of attaching and removing the dummy members. The end portion cut-away technique, on the other hand, results in an extreme reduction in production yield as well as the requirement of an additional step of cutting away the end portions.

SUMMARY OF THE INVENTION

Bearing the foregoing in mind, the present invention has to do with an improved method and an improved apparatus for solving the above-mentioned problem of uneven induction heating due to the V-shape heating phenomenon.

An object of the invention is to provide an improved method and an improved apparatus for induction heating an elongated metal member, wherein additional local induction preheating is applied, prior to overall induction heating, to an end portion or portions of the metal member where the V-shape temperature distribution is anticipated, whereby a uniform heating temperature distribution can be obtained over the whole length of the metal member.

Another object of the invention is to provide an improved method of induction heating an elongated metal member, wherein local induction preheating against an end portion or portions of the metal member is performed continuously to overall induction heating by the use of an induction preheating coil which is movable forward and backward along the direction of conveyance of the metal member.

A further object of the invention is to provide an improved method of induction heating an elongated metal member, wherein an end portion of the metal member is preheated with the use of a conventional induction heating coil, without the use of any additional heating element, by means of controlling conveyance of the metal member against the induction heating coil.

A still further object of the invention is to provide an improved apparatus for induction heating an elongated metal member, which apparatus includes, in addition to a main induction heating coil, a preliminary induction heating coil which is movable along the direction of conveyance of the metal member for preheating an end portion or portions of the metal member.

The above and other objects, features and advantages of the invention will be apparent from the following detailed description taken in conjunction with the accompanying drawings.

DETAILED DESCRIPTION OF THE PREFERRED EMBODIMENTS

Figure 5:
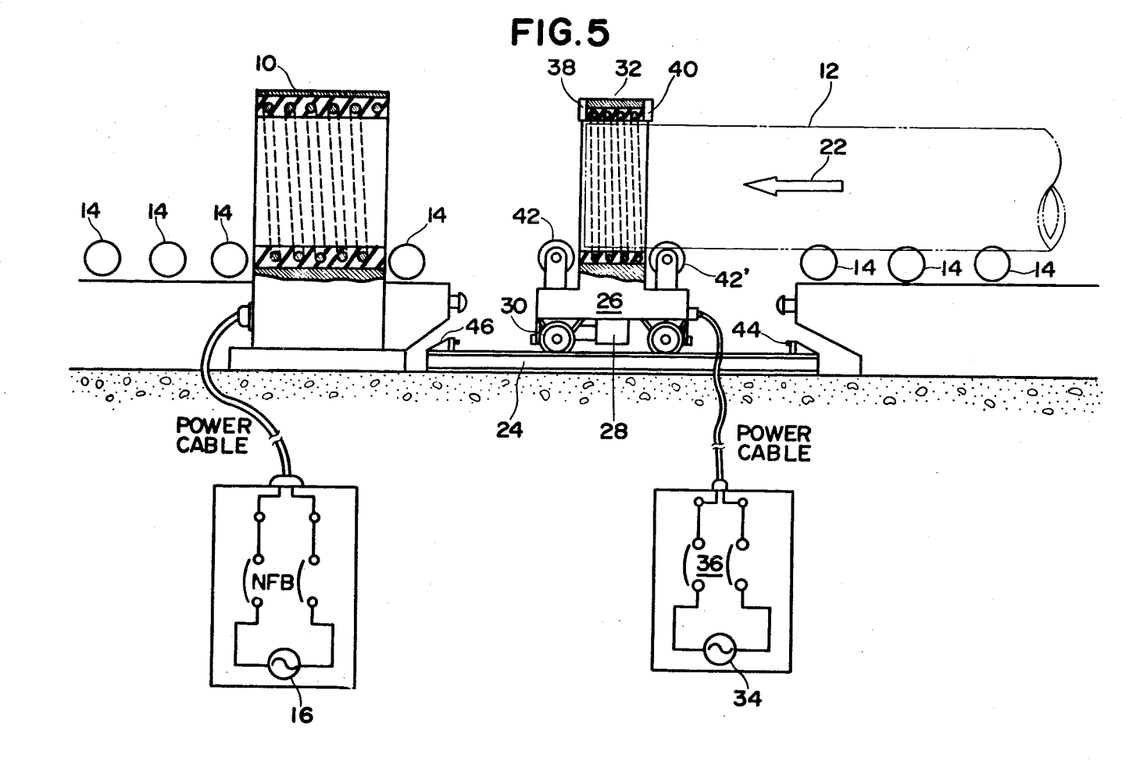
FIG. 5 is a schematic side view of an embodiment of apparatus used for practicing a method of induction heating according to the invention.

FIG. 5 is an explanatory view of an embodiment of apparatus for induction heating used in the invention.

Referring to FIG. 5, a steel pipe 12 is conveyed in the direction of arrow 22 at a predetermined speed by means of conveyor rolls 14 which are revolved by a driving motor. Prior to reaching an induction heating coil 10, the head end portion of the pipe 12 is first locally preheated. For this preheating, a pair of rails 24 are provided on the inlet side on the coil 10 along the direction of conveyance of the pipe 12. The rails 24 carry thereon a truck 26. The truck 26 has a driving motor 28 for driving wheels 30, so that the truck 26 can be moved on the rails 24 forward and backward along the direction of conveyance of the steel pipe 12. The truck 26 carries thereon a preliminary induction heating coil 32. With the truck 26 being moved at a suitable speed, any desired relative movement between the coil 32 and the pipe 12, which is conveyed at a fixed speed, can be obtained. Power supply to the preliminary induction heating coil 32 is made from a power source 34 through a switch 36 which is controlled for operation by means of head end detector 38 and a rear end detector 40. The detectors 38 and 40 comprise each a detection element, such as a photoelectric element or a limit switch mounted on the truck 26, and offer signals of detection of the ends of pipe to close or open the switch 36. Thus, the switch 36 can act as a time limit switch, which is closed at given gime, and then is opened after a period of time which is determined depending on the outer diameter and wall thickness of the steel pipe 12, aimed heating temperature, etc. Since, in the region where the truck 26 moves, the space between the adjacent conveyer rolls 14, 14 is large, the truck 26 is provided with idle rolls 42 and 42' for supporting the pipe 12. The region where the truck 26 moves is defined by a rearward limit switch 44 and a forward limit switch 46. The rearward limit switch 44 defines the start position and the return stop position for the truck 26. The forward limit switch 46 is a limit switch for stopping thereat advance of the truck 26.

Operation of the induction heating apparatus of the invention shown in FIG. 5 will now be described in conjunction with FIGS. 6a to 6j which represent step by step the procedure of operation made according to lapse of time.

Figure 6A:
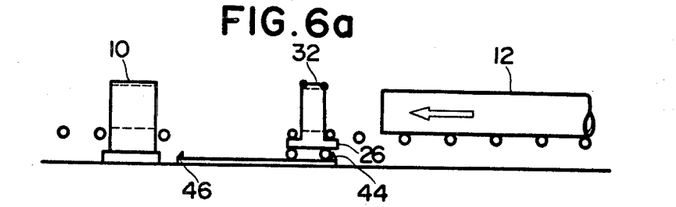
FIGS. 6a to 6j are explanatory views showing, step by step, control procedure in a method of induction heating of the invention, which is performed with the use of the apparatus of FIG. 5.
Figure 6B:
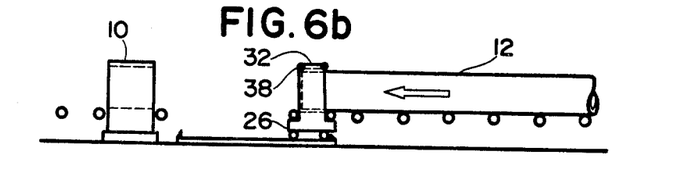

As shown in FIG. 6a, before starting the operation, the truck 26 which carries thereon the preliminary induction heating coil 32 is at the initial position which is defined by the rearward limit switch 44. The steel pipe 12 is conveyed by the conveyer rolls in the direction of the arrow and advances into the preliminary induction heating coil 32. When the head end of the pipe 12 reaches a position where the head end detector 38 is actuated by the head end of the pipe, as shown in FIG. 6b, the switch 36 (FIG. 5) is closed by means of the actuation of the detector 38, thus power being supplied to the coil 32.

Figure 6C:
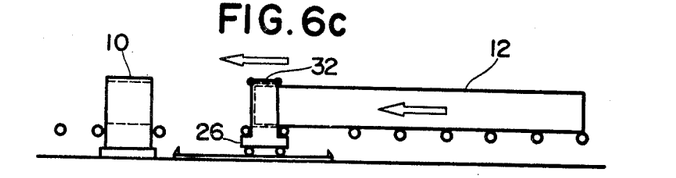

At the same time, the detection signal from the head end detector 38 starts the driving motor of the truck 26 to move the truck 26 together with the pipe 12, as shown in FIG. 6c, in a manner that there is no relative movement between the preliminary induction coil 32 and the head end portion of the steel pipe 12, this head end portion of pipe, which lies in the coil 32, being the portion where the V-shape portion of the heating temperature distribution would take place in the prior art induction heating process. The truck 26 is moved together with the steel pipe 12 for a predetermined period of time so that the end portion of pipe which substantially corresponds to the above-mentioned V-shape heating temperature destribution portion may be heated for the predetermined period of time.

Figure 7:
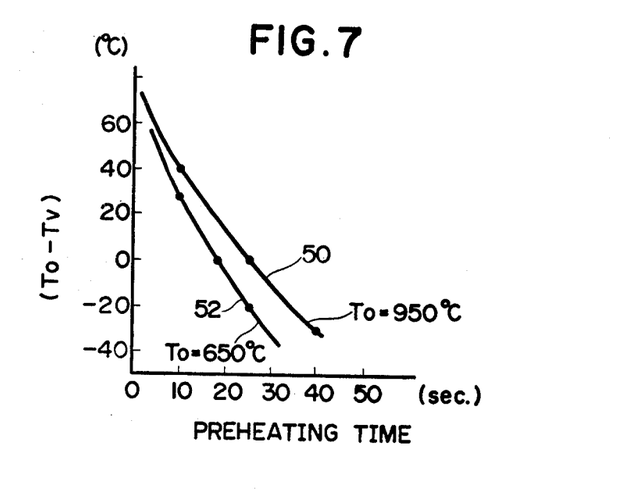
FIG. 7 is a graph representing relationships of preheating time with respect to aimed heating temperatures.

The period of time of heating by the preliminary induction heating coil 32 is determined depending on the size of the V in the heating temperature distribution curve which will be made by the main induction heating coil 10, taking the outer diameter and wall thickness of the steel pipe 12 and the value of power supply as the parameters. Examples for such determination are shown in FIG. 7 which shows relational curves taken with respect to a steel pipe having a 610 millimeter outer diameter and a 25.4 millimeter wall thickness and to a 420 KW power supply. In FIG. 7, the axis of ordinate represents the difference (To-Tv) between an aimed heating temperature To and the minimum temperature Tv in the V-shape heating temperature distribution, i.e., the temperature at the bottom point of V. The axis of abscissa represents the preheating time. A curve 50 shows the relationship between (To-Tv) and time for an aimed temperature of To=950° C., and a curve 52 for an aimed temperature of To=650° C.

Figure 6D:
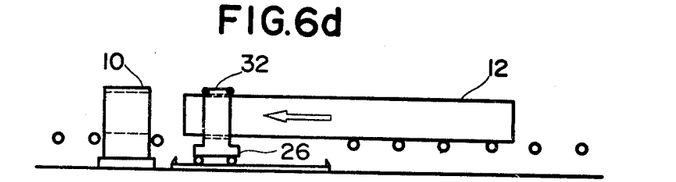
Figure 6E:
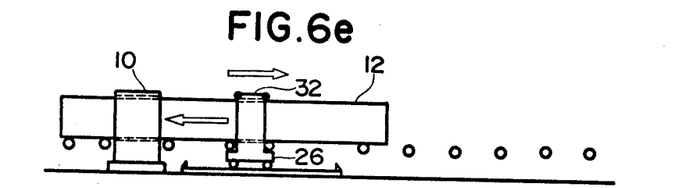
Figure 6F:
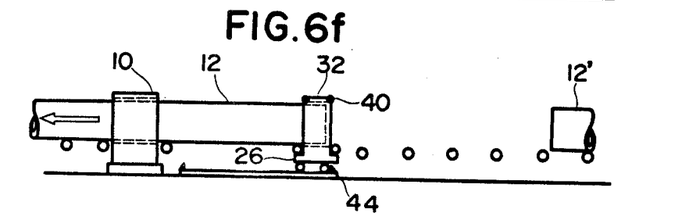

In such a manner as described above, a heating time of the preliminary induction heating coil 32, i.e., a closing time of the switch 36 (FIG. 5) is determined, and, upon lapse of this heating time, the switch 36 is opened to shut off the power supply to the coil 32, thus stopping the preheating by the coil 32. At the same time, the truck 26 is stopped as shown in FIG. 6d, and then the driving motor is reversed to drive the truck 26 backward on the rails as shown in FIG. 6e. When the truck 26 returns back to the initial position, where the rearward limit switch 44 is actuated, as shown in FIG. 6f, the truck 26 is stopped there. The steel pipe 12 continues advancement to come into the induction heating coil 10 to be heated by the coil 10 up to a predetermined aimed temperature.

Figure 6G:
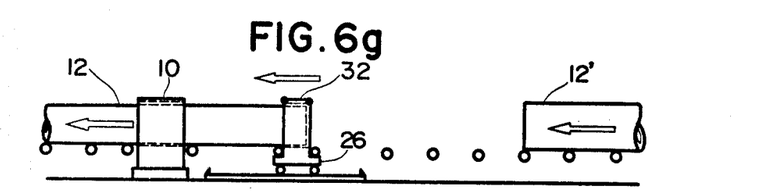
Figure 6H:
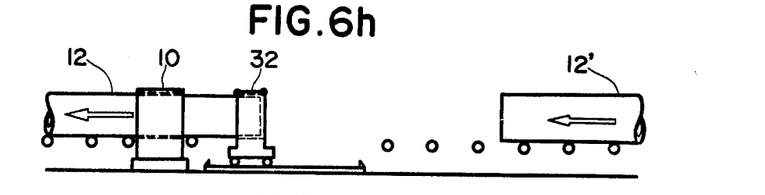
Figure 6I:
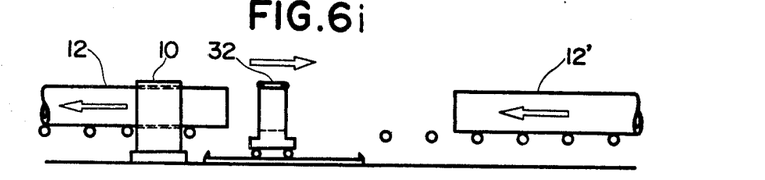
Figure 6J:
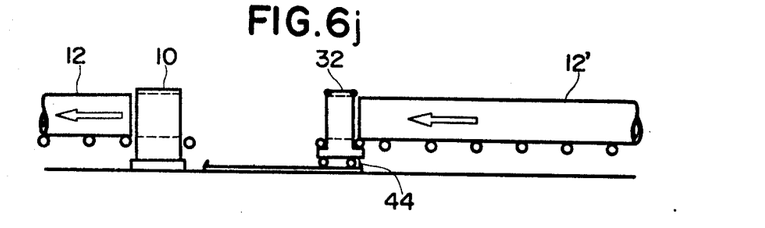

When the rear end of the steel pipe 12 reaches the preliminary induction heating coil 32 as shown in FIG. 6f, preheating against the rear end portion of the pipe 12 is performed in a manner as described below. At the time when the rear end of the steel pipe 12 has just departed from the rear end detector 40, which is mounted on the truck 26 which has returned to and stays at the initial position defined by the rearward limit switch 44, the switch 36 (FIG. 5) is again closed through actuation of the rear end detector 40. At the same time, the driving motor of the truck 26 is actuated to drive the truck 26 forward on the rails in the same direction and at the same speed as the steel pipe 12, as shown in FIG. 6g, and thus the rear end portion of the pipe 12 which lies in the coil 32 is preheated for a predetermined period of time in a like manner as the above, said rear end portion of pipe being the portion which corresponds to the V-shape portion of the above-described heating temperature distribution curve. Upon lapse of the preheating time, the switch 36 (FIG. 5) is opened, the truck 26 stops as shown in FIG. 6h, and, at the same time, the driving motor is reversed to move the truck 26 backward on the rails as shown in FIG. 6i. The truck 26 returns back to the initial position, where the rearward limit switch 44 is actuated, as shown in FIG. 6j, and stays there, thus being ready for heating the next steel pipe 12'. The above-described steps are repeated for every succeeding steel pipes.

Referring again to FIG. 5, at the foremost end of the rails 24 is provided the forward limit switch 46 in order to prohibit the truck 26 from overpassing the rails 24 by forcibly stopping the truck 26 at the position of the switch 46 in case where preheating time is very long.

In place of the above-described timer means, driving time of the truck 26 during which the truck 26 is to be moved can also be controlled by adjusting positions of the limit switch 44 and/or 46 to control distance of movement of the truck 26, wherein the forward limit switch 46 is actuated, by the truck 26 which has moved in the direction of conveyance of the steel pipe 12 and reached the switch 46, to shut off power supply to the preliminary induction heating coil 32 and drive back the truck 26 in the opposite direction. Such positional adjustment of the limit switch is preferred to be made on the rearward limit switch 44.

Figure 8:
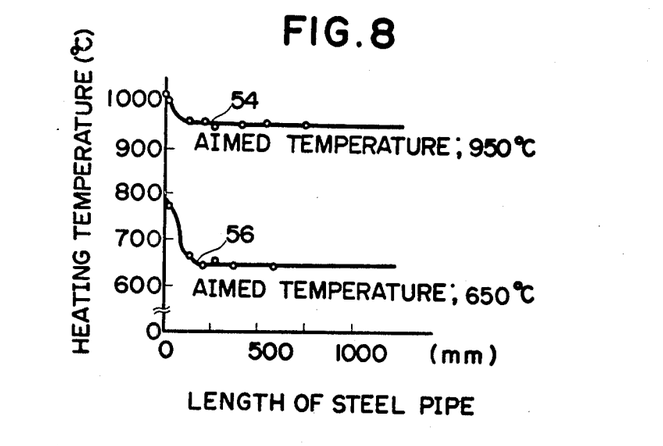
FIG. 8 is a graph representing heating temperature distributions in an end portion of a steel pipe which is induction heated by a method of the invention.

As a result of the above-described method of induction heating according to the invention, substantially uniform distribution of heating temperature was obtained as shown by curves 54 and 56 in FIG. 8. This advantageous effect by the invention will be clearly noticed when comparing the graph of FIG. 8 with the graph of FIG. 2.

While the induction heating apparatus of FIG. 5, which is an embodiment of the invention, is provided with the preliminary induction heating coil 32 separated from the main induction heating coil 10, uniform heating temperature distribution can also be obtained by improving the method of heating operation with the use of the conventional induction heating apparatus of FIG. 1 which has conventionally been used in the dummy pipe technique or in the end portion cut away technique as described hereinabove. In order to realize this improved method of the invention, however, the apparatus of FIG. 1 is further provided with, respectively at the inlet and outlet sides of the induction heating coil 10, a pair of detectors which are similar to the head end detector 38 and the rear end detector 40 provided to the preliminary induction heating coil 32 of FIG. 5.

This method of the invention will now be described in conjunction with FIGS. 9a to 9f which show step by step the procedure of operation. The induction heating coil 10, which is conventional, is further provided with a head end detector 58 and a rear end detector 60 for detecting the ends of a steel pipe 12 which will come into the coil 10.

Figure 9A:
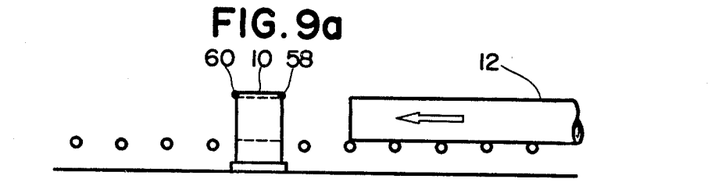
FIGS. 9a to 9f are explanatory views showing, step by step, control procedure in another embodiment of method of the invention wherein a conventional induction heating apparatus is used.
Figure 9B:
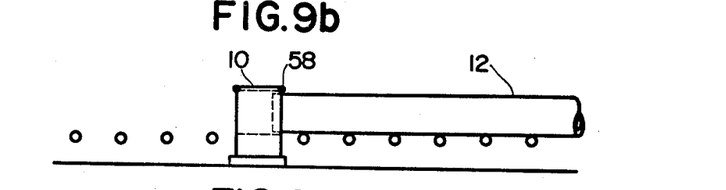
Figure 9C:
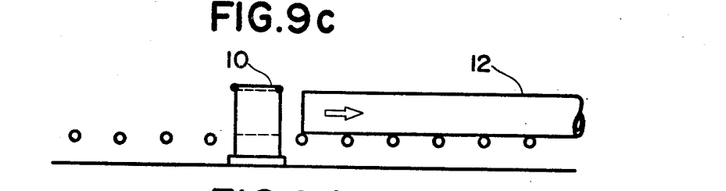

Referring first to FIG. 9a, the steel pipe 12 is conveyed toward the induction heating coil 10, which is, at this time, not supplied with power. When the head end portion of the steel pipe 12 comes into the induction heating coil 10 as shown in FIG. 9b, the head end detector 58 is actuated to stop conveyance of the pipe 12, and power is supplied to the coil 10 to preheat the top end portion of the pipe 12 for a predetermined period of time. Upon lapse of this time, the power supply to the induction heating coil 10 is shut off, and the steel pipe 12 is moved back some distance and stopped so that the head end portion thereof may go back out of the coil as shown in FIG. 9c. Subsequent to this, the steel pipe 12 is again conveyed forward to pass the induction heating coil 10 at a predetermined speed while the coil 10 is again supplied with power as shown in FIG. 9d, thus the pipe 12 being continuously heated by the coil 10 at an aimed temperature.

Figure 9D:
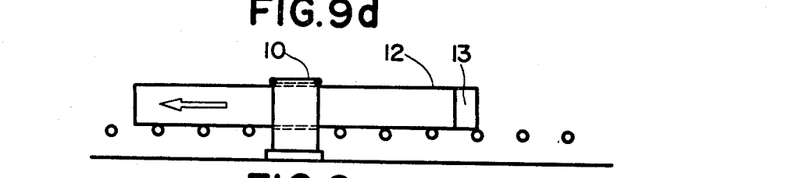
Figure 9E:
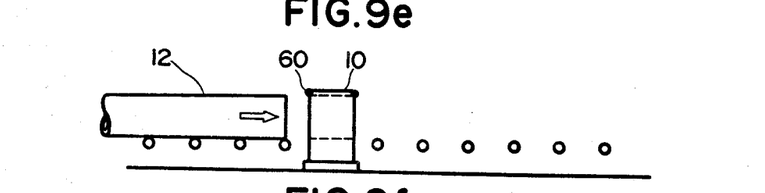
Figure 9F:
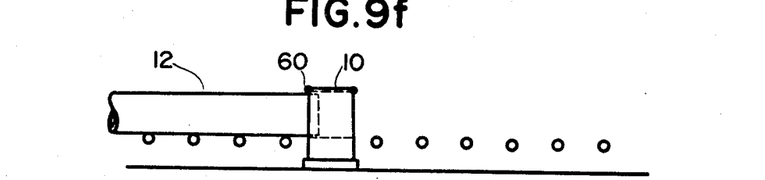

In case the local preheating for the purpose of obtaining a uniform heating temperature distribution is performed only on the front end portion of the steel pipe 12, a dummy pipe 13 is attached to the rear end of the steel pipe 12 as shown in FIG. 9d. This dummy pipe 13 will then be removed from the steel pipe 12 after overall heating for the steel pipe 12 is finished. Alternatively, instead of attaching a dummy pipe to the rear end of the steel pipe 12, the rear end portion of the steel pipe 12 itself is cut away after overall heating of the pipe 12 is finished.

As will be understood from the above description, according to the invention, by employing additional local induction heating in the end portion or portions of an elongated metal member, the V-shape portion or portions of heating temperature distribution which have taken place in the prior art can be minimized or substantially eliminated. Thus, in the invention, substantially uniform induction heating can be obtained over the whole length of the metal member, and accordingly increase in production yield and reduction in the number of steps of operation as well as better uniformity in quality and better stability in shape of the treated metal member can be achieved. Further, the method of the invention can also be realized by using the conventional induction heating apparatus with a few additional elements or devices attached thereto. Further, according to the invention, if a dummy member is employed, one dummy member is sufficient to prevent uneven heating temperature distribution, and accordingly the number of steps of operation required for the dummy member technique can be reduced by half as compared with that in the prior art. According to the invention, loss or cut away portion of a metal due to uneven heating temperature distribution can be reduced to less than 50 millimeters for the metal member of any size.

While the invention has been described in its preferred embodiments, it is to be understood that various changes and modifications can be made without departing from the spirit and scope of the invention.

What is claimed is:

1. A method for induction heating a metal member by induction heating coil means, comprising the steps of: conveying said metal member through induction heating coil means; holding an end portion of said metal member and said induction heating coil means for preventing relative movement therebetween for preliminary heating of said end portion for a predetermined period of time to obtain substantially uniform heating temperature distribution throughout said metal member; detecting incoming of a head end portion of said metal member into a preliminary induction heating coil provided on the inlet side of a main induction heating coil for movement in both directions along a direction of conveyance of said metal member toward said heating coils, to move said preliminary induction heating coil together with said head end portion of the metal member in a manner that there is no relative movement therebetween for preheating said head end portion for a predetermined period of time; moving said preliminary induction heating coil in the opposite direction to return said coil to its initial position; and detecting incoming of a rear end portion of said metal member into said preliminary induction heating coil together with said rear end portion of the metal member in a manner that there is no relative movement therebetween to preheat said rear end portion for a predetermined period of time.

2. A method for induction heating a metal member by induction heating coil means, comprising the steps of: conveying said metal member through heating induction coil means; holding an end portion of said metal member and said induction heating coil means for preventing relative movement therebetween for preliminary heating of said end portion for a predetermined period of time to obtain substantially uniform heating temperature distribution throughout said metal member; detecting incoming of a head end portion of said metal member, which is conveyed in a forward direction toward said induction heating coil and into said coil to stop the conveyance of said metal member with respect to said induction heating coil to preheat said head end portion for a predetermined period of time; and conveying said metal member in the opposite direction to draw said metal member out of said induction heating coil, said metal member being thereafter conveyed again in said forward direction to pass through said induction heating coil at a fixed condition for heating the whole length of said metal member; only said head end portion of the metal member being subjected to preliminary induction heating.

3. A method for induction heating a metal member by induction heating coil means, comprising the steps of: conveying said metal member through heating induction coil means; holding an end portion of said metal member and said induction heating coil means for preventing relative movement therebetween for preliminary heating of said end portion for a predetermined period of time to obtain substantially uniform heating temperature distribution throughout said metal member, detecting incoming of a head end portion of said metal member, which is conveyed in a forward direction toward said induction heating coil, into said coil to stop the conveyance of said metal member with respect to said induction heating coil to locally heat said head end portion; conveying said metal member in the opposite direction to draw out said metal member from said induction heating coil, said metal member being thereafter conveyed again in said forward direction to pass through said induction heating coil at a fixed speed for a continuous heat treatment over the whole length of said metal member; detecting outgoing of the rear end of said metal member from said induction heating coil to convey said metal member back in the opposite direction toward said induction heating coil; detecting incoming of a rear end portion of said metal member into said induction heating coil to stop the conveyance of said metal member with respect to said induction heating coil to locally heat said rear end portion for a predetermined period of time; and conveying said metal member again in said forward direction to draw out said metal member from said induction heating coil.

* * * * *